US010000981B2

(12) United States Patent
Nott et al.

(10) Patent No.: US 10,000,981 B2
(45) Date of Patent: Jun. 19, 2018

(54) BACK PRESSURE CONTROL SYSTEM (71) Applicant: Canrig Drilling Technology Ltd., Houston, TX (US)

(72) Inventors: Darcy Nott, The Woodlands, TX (US); Stuart Butler, Spring, TX (US); Dean Rambo, Kingwood, TX (US)

(73) Assignee: CANRIG DRILLING TECHNOLOGIES LTD., Houston, TX (US)

( * ) Notice: Subject to any disclaimer, the term of this patent is extended or adjusted under 35 U.S.C. 154(b) by 251 days.

(21) Appl. No.: 14/659,933

(22) Filed: Mar. 17, 2015

(65) Prior Publication Data
US 2015/0267490 A1 Sep. 24, 2015

Related U.S. Application Data (60) Provisional application No. 61/968,809, filed on Mar. 21, 2014.

(51) Int. Cl.
| | |
|---|---|
| *E21B 21/08* | (2006.01) |
| *E21B 21/10* | (2006.01) |
| *F16K 3/12* | (2006.01) |
| *F16K 11/083* | (2006.01) |

(52) U.S. Cl.
CPC ............. *E21B 21/08* (2013.01); *E21B 21/10* (2013.01); *F16K 3/12* (2013.01); *F16K 11/083* (2013.01)

(58) Field of Classification Search
CPC ........ E21B 21/08; E21B 21/10; E21B 21/106; F16K 3/12; F16K 11/083
USPC .................................................... 137/315.02
See application file for complete search history.

(56) References Cited

U.S. PATENT DOCUMENTS

| | | | | |
|---|---|---|---|---|
| 2,001,271 | A | * | 5/1935 | Smith ................. F16K 3/30 137/240 |
| 3,470,971 | A | | 10/1969 | Dower |
| 4,291,772 | A | | 9/1981 | Beynet |
| 5,014,730 | A | * | 5/1991 | Fye ................... F16K 3/0227 137/454.2 |
| 5,431,188 | A | | 7/1995 | Cove |
| 6,415,877 | B1 | | 7/2002 | Fincher et al. |
| 6,904,981 | B2 | | 6/2005 | van Riet |
| 7,828,081 | B2 | | 11/2010 | Reitsma |
| 7,836,973 | B2 | | 11/2010 | Belcher et al. |
| 8,308,132 | B2 | | 11/2012 | Partridge |
| 8,360,170 | B2 | | 1/2013 | Leuchtenberg |
| 2003/0024737 | A1 | * | 2/2003 | Chang .................. E21B 21/08 175/25 |
| 2006/0086538 | A1 | | 4/2006 | Van Riet |
| 2007/0151763 | A1 | | 7/2007 | Reitsma et al. |
| 2009/0236144 | A1 | | 9/2009 | Todd et al. |
| 2009/0321077 | A1 | | 12/2009 | Norman |
| 2011/0067923 | A1 | * | 3/2011 | Leuchtenberg ......... E21B 21/08 175/57 |

(Continued)

FOREIGN PATENT DOCUMENTS

EP   1488073 B1   8/2006

OTHER PUBLICATIONS

International Search Report for Application No. PCT/US2015/020922, dated Jun. 18, 2015, 1 page.

*Primary Examiner* — Cathleen R Hutchins
(74) *Attorney, Agent, or Firm* — Enrique Abarca; Abel Law Group, LLP (57) ABSTRACT

A back pressure control system adapted to be at least partially integrated with a drill rig.

18 Claims, 4 Drawing Sheets

(56) References Cited

U.S. PATENT DOCUMENTS

| | | |
|---|---|---|
| 2013/0014993 A1 | 1/2013 | Jeffries |
| 2013/0146357 A1 | 6/2013 | Lovorn |
| 2013/0299240 A1 | 11/2013 | Leuchtenberg |
| 2014/0305705 A1* | 10/2014 | Duhe .................. E21B 21/08 175/48 |

* cited by examiner

BACK PRESSURE CONTROL SYSTEM

CROSS-REFERENCE TO RELATED APPLICATION(S)

This application claims priority under 35 U.S.C. § 119(e) to U.S. Patent Application No. 61/968,809 entitled "BACK PRESSURE CONTROL SYSTEM," by Darcy Nott, Stuart Butler, and Dean Rambo, filed Mar. 21, 2014, which is assigned to the current assignee hereof and incorporated herein by reference in its entirety.

FIELD OF THE DISCLOSURE

The present disclosure relates to a drilling system, and more particularly to a back pressure control system utilized during drilling operations.

RELATED ART

Drilling subterranean wells for oil and gas is expensive and time consuming. Formations containing oil and gas are typically located thousands of feet below the earth's surface. Therefore, to access the oil and gas, thousands of feet of rock and other geological formations must be drilled and removed. Many problems exist when drilling below the earth's surface, with blowouts caused by rapid pressure fluctuation being the most dangerous.

Traditional drilling generally relies on the maintenance of hydrostatic pressure within an annular region between a drill string and a wellbore, known as the annulus, in order to prevent formation fluids from entering the borehole, uncontrollable pressure changes, and to permit continuous drilling. Ideally, drilling fluid is circulated down the drill string and returns to the surface up the annulus. To facilitate safe return of the drilling fluid, an equivalent circulating density (ECD) is created within the wellbore that is greater than the pore pressure of the geological formation, but below the pressure necessary to fracture the formation. The pressure zone within this range is often referred to as the acceptable bottomhole pressure window. If at any point the bottom hole pressure created by ECD goes outside the acceptable bottomhole pressure window, the drilling operator must adjust drilling parameters or risk damaging the well or having a blowout.

The industry continues to demand improvements in drilling systems, particularly in the area of back pressure control and hydrostatic pressure maintenance in order to better, safer, and more efficiently control ECD and reduce the costs associated with drilling.

BRIEF DESCRIPTION OF THE DRAWINGS

Embodiments are illustrated by way of example and are not limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "substantially" refers to a value falling in a range of plus-or-minus (±) about 10% of the value of that characteristic, such as ±about 8% of the value of that characteristic, ±about 6% of the value of that characteristic, ±about 4% of the value of that characteristic, ±about 3% of the value of that characteristic, ±about 2% of the value of that characteristic, or even ±about 1% of the value of that characteristic.

As used herein, the term "in series" refers to an arrangement when two (or more) objects are arranged in serial such that the discharge of one object is connected to the intake side of the second object. In such a manner, a medium must necessarily pass through both the first and second objects. Conversely, the term "in parallel" refers to an arrangement when two (or more) objects are arranged such that they share the same (or substantially same) properties across their ends and a medium can flow through either one, or both, of the objects.

Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the drilling arts.

The concepts are better understood in view of the embodiments described below that illustrate and do not limit the scope of the present invention. The following description is directed to a drilling system, and particularly, to a back pressure control system utilized during drilling operations.

In general, embodiments of the back pressure control system described herein can be used in any manner to maintain, or help maintain, hydrostatic pressure within a subterranean wellbore at a selected pressure. In particular, embodiments of the back pressure control system can be utilized during installation of additional drill pipe segments to a drill string, during tripping operations, or even to manage well kicks and sudden rapid changes of pressure caused by malfunction or rapid geological regime shifts.

Embodiments of the herein described back pressure control system offer at least the following advantages. The back pressure control system is lighter (i.e., less than 1,500 lbs.) than previously known pressure control systems. The back pressure control system is positioned at a physical height such that the main line extending from the wellbore to the fluid return system is maintained at a constant, or relatively constant, slope, devoid of vertical fluctuations. The back pressure control system can be operated from within the drill rig, rather than by a third party operator away from the drill rig. The back pressure control system can operate, or substantially operate, without impeding fluid flow through the main line.

Figure 1:
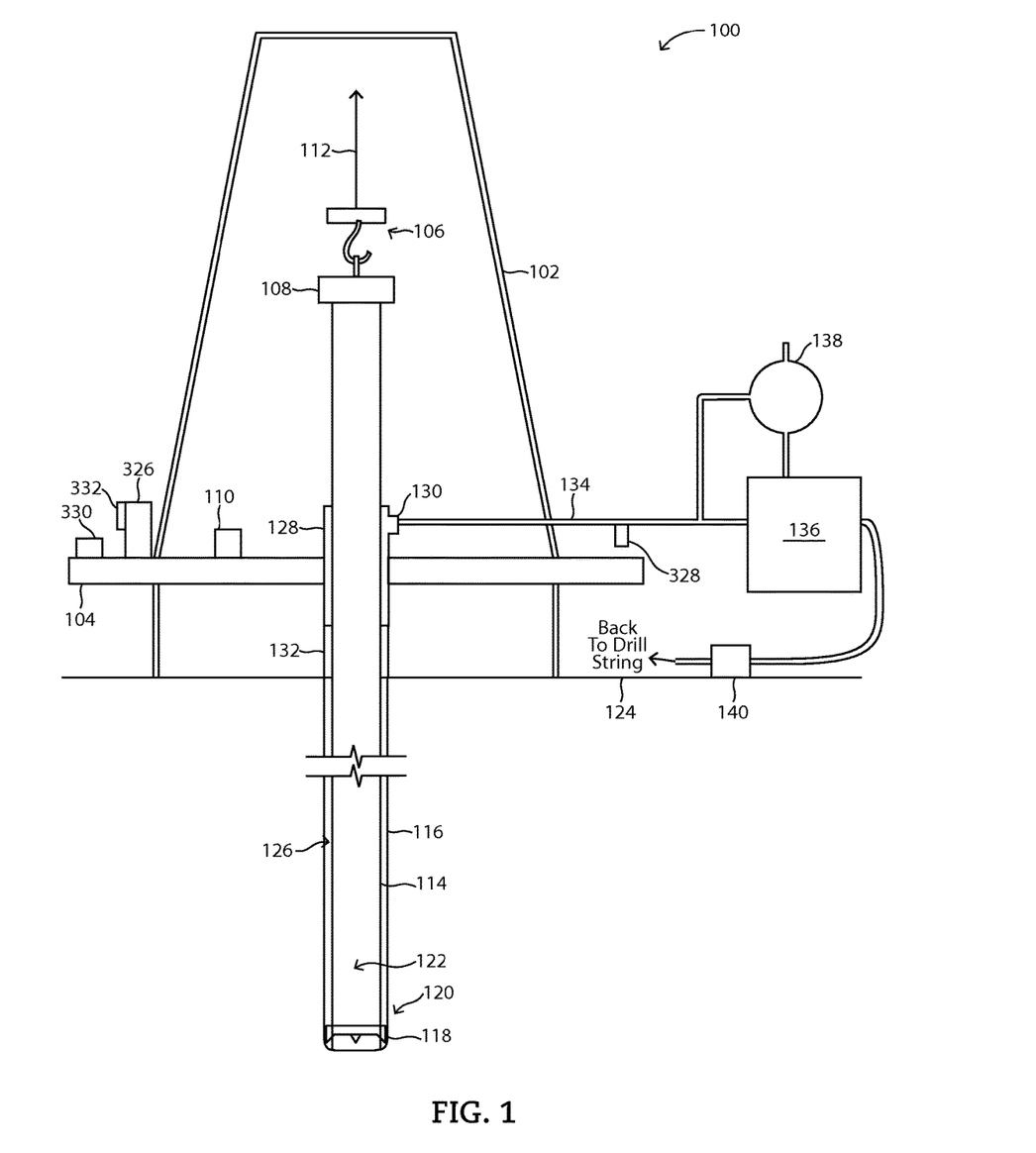
FIG. 1 includes a schematic view of a system for drilling in accordance with an embodiment.

Referring now to the drawings, FIG. 1 shows a drilling rig 100 for drilling a subterranean formation. The drilling rig 100 can generally include a drilling rig 100 and a drill string 114 extending down into a wellbore 116, also referred to as a borehole.

The drilling rig 100 can generally include a substructure 104 and a derrick 102. The derrick 102 can be attached to the substructure and can extend therefrom. The derrick 102 can be a tower or a guyed mast such as a pole hinged at a bottom end. The derrick 102 and substructure 104 can be permanent or can be adapted to break down into smaller components for transportation.

The drilling rig 100 can be an offshore drilling rig or a land based drilling rig. Offshore drilling rigs can take many forms. For example, the drilling rig 100 can have a fixed platform or substructure attached to an underlying seabed. Alternatively, the drilling rig 100 can have a floating platform resting at least partially underwater with an anchoring system holding the drilling rig 100 relatively near the underwater drilling operation. It should be understood that the particular configuration and embodiment of the drilling rig 100 are not intended to limit the scope of the present disclosure.

In a particular non-limiting embodiment, the drilling rig 100 can further include a hoisting system 106, a rotating system 108, and a power supply 110. The derrick 102 can support the hoisting system 106, and the rotating system 108 and can support a line system 112 engaged with the hoisting system 106. The hoisting system 106, rotating system 108, and line system 112 can be used to affect vertical movement of the drill string 114 within the wellbore 116.

The drill string 114 can comprise jointed drill sections, coiled tubing, and wired pipe sections. In particular embodiments, the drill string 114 can be constructed from hollow, thin-walled drill pipe segments screwed to one another by threaded fasteners. The lower sections of the drill string 114 (e.g., the bottom pipe sections) can have generally larger wall thickness to sustain operation at higher pressures without buckling.

A drill bit 118 can be engaged at the lower end of the drill string 114. A bottomhole assembly (BHA) 120 may be contained in the drill string 114. More particularly, the BHA 120 may be positioned along the drill string 114 substantially proximate the drill bit 118. The BHA 120 can include measurement tools, mud motors, hole reamers, stabilizers, steering assemblies, and/or any other tools used in the drilling art.

A drilling fluid 122 can be pumped into the drill string 114 by one or more pumps 140 positioned at or near the surface 124. The drilling fluid 122 can be pushed through the hollow interior of the drill string 114 and can emerge at the drill bit 118, where it can travel back to the surface 124 through the annulus 126, as formed between the drill string 114 and the inner wall of the wellbore 116. As the drilling fluid 122 circulates through the drill string 114 and the annulus 126 it can transport drill cuttings from the geological formation at the bottom of the wellbore 116 to the surface 124. In such a manner, the drilling fluid 122 can maintain the structure of the annulus and keep the wellbore 116 free of backup caused by cuttings and geological removal. Additionally, the drilling fluid can keep the drill bit 118 cool and clean during operation, while maintaining hydrostatic pressure and annulus integrity.

Many types of drilling fluid exist. Some drilling operations require use of different types of drilling fluid 122 throughout the drilling process, or that some types be used in combination with others. Water-based drilling fluid 122 most commonly comprises bentonite clay with additives, such as, for example, barium sulfate, calcium carbonate, or hematite. Thickeners, such as xanthan gum, guar gum, glycol, carboxymethylcellulose, polyanionic cellulose, or starch, may be introduced to affect a desirable viscosity. Deflocculants can conversely be used to reduce viscosity of the drilling fluid 122.

In certain embodiments, the wellbore 116 can be capped by a well closure system 128, such as, for example, a rotating pressure control device (RCD). Alternatively, the well closure system 128 can be a bell nipple. The well closure system 128 can be adapted to maintain the drilling fluid within the annulus 126 while permitting the drill string 114 to advance into the wellbore 116 and rotate therein. When utilizing an RCD, the well closure system 128 can maintain and hold back a generated pressure within the annulus. In line with increasing state and Federal regulation, the drilling rig 100 can further include a blowout preventer (BOP) 132. The well closure system 128 may be positioned above, and in fluid communication with, the BOP 132.

During operation, drilling fluid 122 can exit through the well closure system 128 or immediately therebelow through an exit port 130. A main line 134 (return flow line) can be attached to the exit port 130. In particular embodiments, the main line 134 can extend from the exit port 130 to a fluid return assembly 136.

The fluid return assembly 136 can comprise a shale shaker or other shale conveyer adapted to separate solids from the drilling fluid 122. The shale shaker can include a hopper, a feeder, a screen basket, a basket angling mechanism, a vibrator, or any combination thereof. The shale shaker can remove solid particles and convey the drilling fluid 122 to a mud pit where the finer particles can settle, chemicals can be added, and the drilling fluid 122 can be prepped for reuse.

After the drilling fluid 122 has been fully prepped it can be sent back to the drilling rig 100 for another cycle through the well system. In this manner, the drilling fluid 122 can form a closed loop system.

In particular embodiments, the fluid return assembly 136 can further include a mud/gas separator 138 (also known as a degasser, or a gas buster). Generally, returning drilling fluid 122 can contain natural gases or other flammable materials which can collect in the shale shaker. The mud/gas separator 138 can include a plurality of baffles or sections designed to separate the flammable materials from the drilling fluid 122, permitting the flammable materials to be moved into a flare line for safe discharge. In this regard, it can be desirable to position the mud/gas separator 138 in series with the main line 134 (and not connect the mud/gas separator by use of an auxiliary line) to ensure that all flammable material passes therethrough. Fluid returns can then pass to the fluid return assembly 136.

Figure 2:
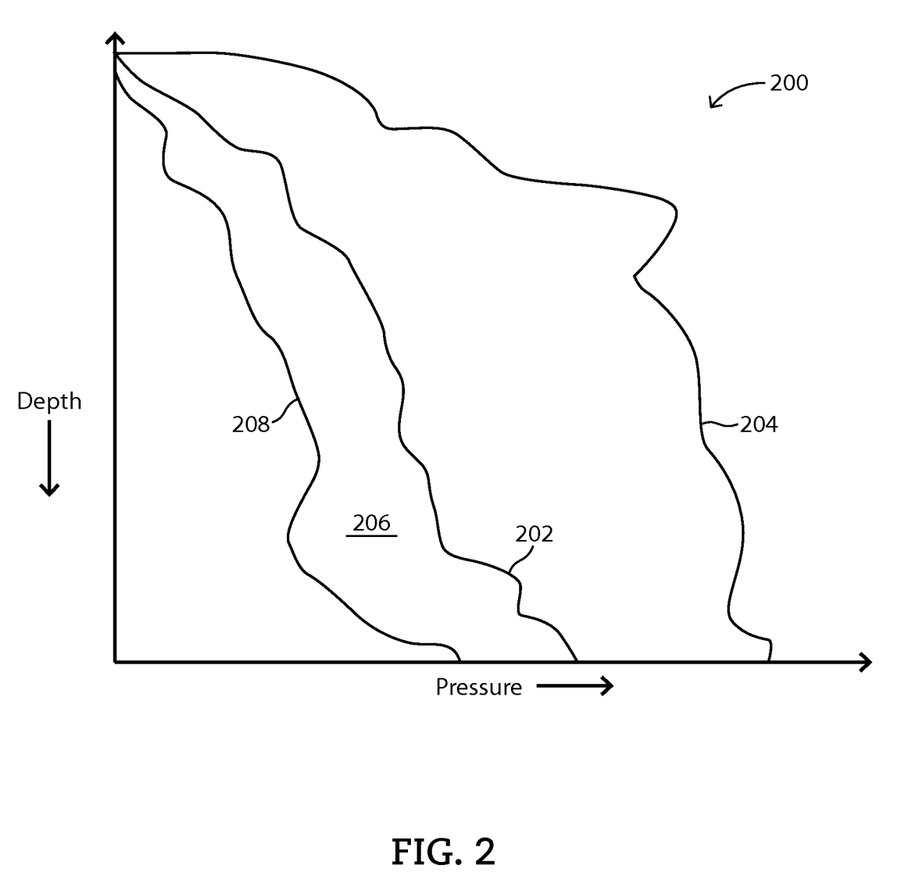
FIG. 2 includes a diagram illustrating a pressure profile within an exemplary wellbore as a function of depth.

Several hydraulic models exist for determining the set point pressure which may be applied to the annulus 126 at, or near, the surface 124 to affect a downhole annulus pressure at a predetermined location within a predetermined range. As shown in FIG. 2, in a particular embodiment, the set point pressure can be within the acceptable bottomhole pressure window 200. That is, the set point pressure can be greater than the pore pressure 202 of the geological formation, but below a pressure necessary to fracture the formation 204 (this is also known as over-balanced drilling). In another embodiment, such as during under-balanced drilling 206, the set point pressure can be less than the pore pressure 202 of the formation, but greater than the wellbore stability pressure 208. The pore pressure 202, fracture pressure 204, and wellbore stability pressure 208 are generally determined by the well type and geological formations being drilled.

Figure 3:
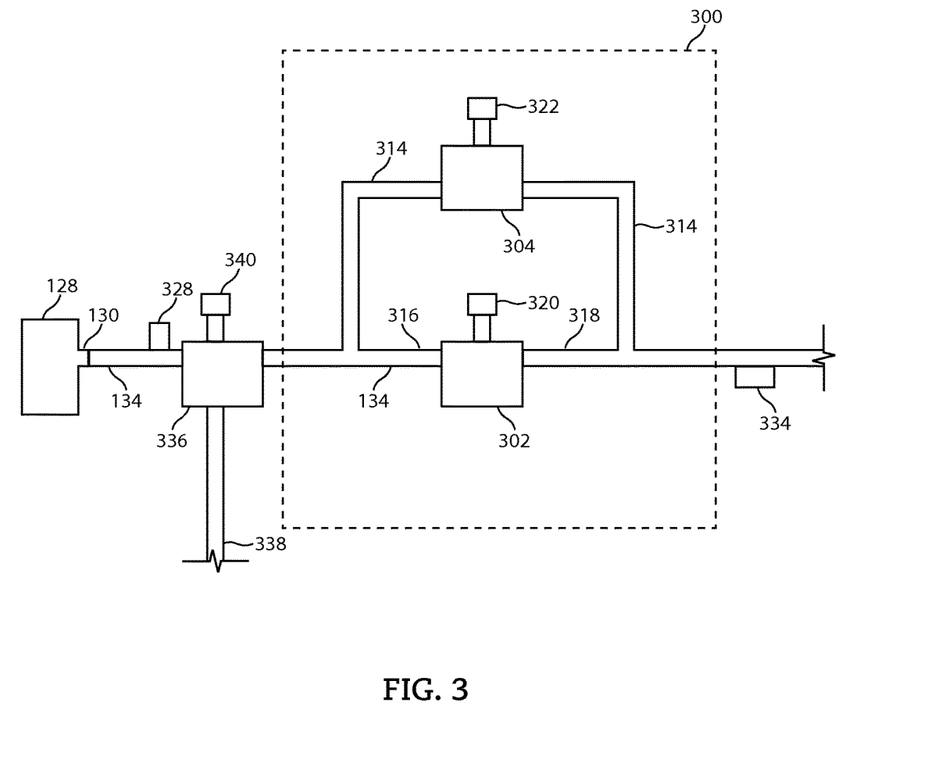
FIG. 3 includes a schematic view of a back pressure control system in accordance with an embodiment.

To affect the necessary hydrostatic pressure within the annulus 126, the main line 134 can further include a back pressure control system 300, as shown in FIG. 3. In general, the back pressure control system 300 can comprise a valve 302 and an adjustable flow control apparatus 304.

The valve 302 and the adjustable flow control apparatus 304 can be arranged along the main line 134 in parallel. In this regard, the valve 302 can be used as a pressure release valve. More particularly, in certain embodiments, the valve 302 can be positioned in series with the main line 134 while the adjustable flow control apparatus 304 can be positioned on a secondary line 314 in parallel with the main line 134 connected to the main line 134 at opposite sides 316 and 318 of the valve 302. In alternative embodiments, the adjustable flow control apparatus 304 can be positioned in series with the main line 134 while the valve) can be positioned on a secondary line 314 in parallel with the main line 134 connected to the main line 134 at opposite sides 316 and 618 of the adjustable flow control apparatus 304.

In a particular embodiment, the valve 302 can comprise a ball valve (such as a full bore ball valve), a butterfly valve, a gate valve, a globe valve, a plug valve, or any combination thereof. The valve 302 can be a quarter turn (i.e., 90°) valve adapted to operatively move between an open and closed position. A stem (not shown) can extend radially outward from the valve 302 and engage along a rotatable central axis with a motor 320. In certain embodiments, the motor 320 may comprise a pneumatic or hydraulic actuated motor. In further embodiments, the motor 320 may comprise a servomotor. In a particular aspect, the valve 302 can be adapted to move between a fully-open and a fully-closed orientation in less than about 5 seconds, such as less than about 4 seconds, less than about 3 seconds, less than about 2 seconds, less than about 1 second, less than about 0.5 seconds, or even less than about 0.25 seconds. Moreover, in another aspect, the valve 302 can be adapted to move between a fully-open and a fully-closed orientation within a range between and including any of the values described above.

In a particular embodiment, the adjustable flow control apparatus 304 can comprise a ball valve, a butterfly valve, a gate valve, a globe valve, a plug valve, a choke, or any combination thereof. The adjustable flow control apparatus 304 can be a quarter turn (i.e., 90°) valve adapted to operatively move between an open and closed position. A stem (not shown) can extend radially outward from the adjustable flow control apparatus 304 and engage along a rotatable central axis with a motor 322. In certain embodiments, the motor 322 may comprise a servomotor. In a particular aspect, the adjustable flow control apparatus 304 can be adapted to move between a fully-open and a fully-closed orientation in less than about 5 seconds, such as less than about 4 seconds, less than about 3 seconds, less than about 2 seconds, less than about 1 second, less than about 0.5 seconds, or even less than about 0.25 seconds. Moreover, in another aspect, the adjustable flow control apparatus 304 can be adapted to move between a fully-open and a fully-closed orientation within a range between and including any of the values described above.

In a particular embodiment, the adjustable flow control apparatus 304 can be self-clearing. The adjustable flow control apparatus 304 can be shaped such that the valve internals are cleaned during usage in the full open position. In this regard, the adjustable flow control apparatus 304 can operate consistently without clogging, plugging, or exhibiting back-up that may result from the passage of solid-laden drilling fluid 122 therethrough.

Figure 4A:
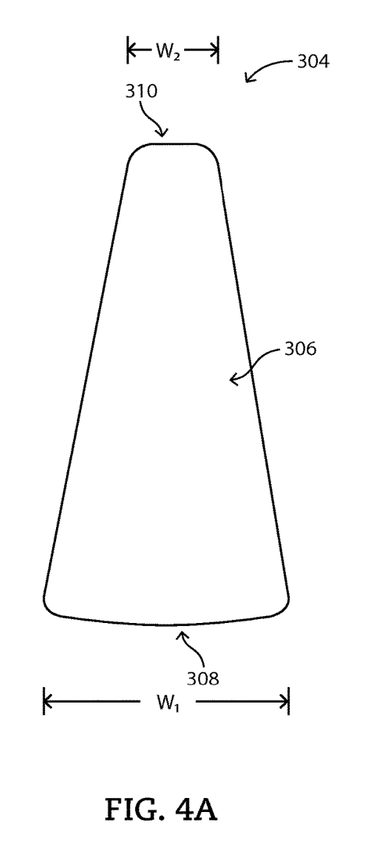
FIG. 4A includes a front view of an asymmetrical opening of an adjustable flow control apparatus in accordance with an embodiment.
Figure 4B:
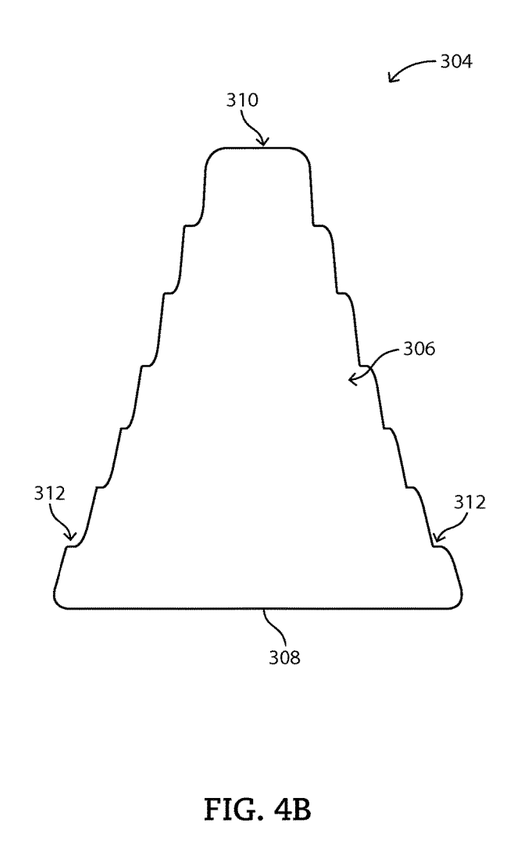
FIG. 4B includes a front view of an asymmetrical opening of an adjustable flow control apparatus in accordance with another embodiment.

Referring now to FIGS. 4A and 4B, in particular embodiments, the adjustable flow control apparatus 304 can comprise an asymmetrical opening 306 while in the open orientation, as viewed in a plane parallel to a fluid flow. More particularly, the adjustable flow control apparatus 304 can have a vertical profile defining a first vertical end 308 and a second vertical end 310, where the second vertical end 310 is above the first vertical end 308. In particular embodiments, when opening the adjustable flow control apparatus 304, the first vertical end 308 of the asymmetrical opening 306 can be exposed first to fluid flow. In this regard, the asymmetrical opening 306 of the adjustable flow control apparatus 304 can open from the bottom end to the top end, assisting fluid flow and promoting a self-clearing fluidic flow characteristic.

The asymmetrical opening 306 can comprise any shape when viewed in a plane parallel to the fluid flow, such as, for example, a generally polygonal shape, a generally ellipsoidal shape, or any combination thereof. In particular embodiments, the asymmetrical opening 306 can comprise a generally triangular shape when viewed in a plane parallel to the fluid flow.

In yet further embodiments, the asymmetrical opening 306 can comprise any number of additional shapes, including arcuate surfaces or even stepped edges 312, as shown in FIG. 4B.

In a particular embodiment, the first vertical end 308 can have a width, $W_1$, as seen when viewed in a plane parallel to a fluid flow in the main line. Moreover, the second vertical end 310 can have a width, $W_2$, as seen when viewed in a plane parallel to the fluid flow in the main line. In certain embodiments, $W_1$ can be no less than about 1.1 $W_2$, such as no less than about 1.25 $W_2$, no less than about 1.5 $W_2$, no less than about 1.75 $W_2$, no less than about 2.0 $W_2$, no less than about 2.5 $W_2$, no less than about 3.0 $W_2$, no less than about 5 $W_2$, no less than about 10 $W_2$, no less than about 15 $W_2$, no less than about 20 $W_2$, no less than about 30 $W_2$, no less than about 50 $W_2$, no less than about 75 $W_2$, or even no less than about 100 $W_2$. In further embodiments, $W_1$ can be no greater than about 500 $W_2$, such as no greater than about 400 $W_2$, no greater than about 300 $W_2$, no greater than about 200 $W_2$, or even no greater than about 125 $W_2$. Moreover, $W_1$ can be within a range between and including any of the values described above.

Referring again to FIGS. 2 and 3, during routine drilling operations, the valve 302 can be oriented and maintained in the open configuration. In this regard, drilling fluid 122 can pass unimpeded through the main line 134 and the valve 302 to the fluid return assembly 136. Whenever the hydrostatic pressure within the annulus is about to drop (i.e., the pressure therein is insufficient to maintain the drilling fluid 122 at a continuous pressure), the valve 302 can be reoriented to the closed position, requiring fluid to flow through the adjustable flow control apparatus 304. This may occur, for example, when the geological regime of the formation being drilled changes (e.g., the pore pressure increases or decreases), or when drilling is paused (i.e., to add or remove a pipe segment to the drill string).

Referring again to FIG. 1, a drilling operator or driller can control and operate the back pressure control system 300. In such a manner, the drilling operator can adjust the back pressure control system 300 to redirect the drilling fluid 122 therethrough. The drilling operator can affect control of the back pressure control system 300 by use of an Operator Control System (OCS). THE OCS can help a driller determine back pressure requirements. The OCS can comprise a control element 326, either integrally positioned within the drilling rig 100 or externally mounted thereon. Alternatively, the OCS can be at least partially detached from the drill rig 100 (i.e., only the physical measuring components associated with the OCS are attached to the drill rig 100). In this regard, the OCS can be controlled from within the drilling rig 100 or from a remote location. By sending control signals to the control element 326, the drilling operator can control the back pressure control system 300, e.g., control valve position between open and closed.

In particular embodiments, the OCS can further comprise a sensor 328 adapted to repeatedly sense a measurable parameter (e.g., pressure within the annulus, main line, fluid return assembly, or any combination thereof); a logic element 330 in communication with the sensor, the logic element 330 adapted to perform a calculation based on the measurable parameter; and a display 332 in communication with the logic element, the display 332 adapted to relay the calculated measurable parameter to the drilling operator. In a certain aspect, the operator can then affect the control element 326 in response to the calculated measurable parameter. Additionally, or alternatively, the calculated measurable parameter can be sent directly to the control element 326 to automatically adjust the back pressure control system 300.

As shown in FIG. 3, in certain embodiments, the sensor 328 can be positioned along the main line 134 between the exit port 130 of the well closure system 128 and the back pressure control system 300. In other embodiments, the sensor 328 can be positioned within the back pressure control system 300. In yet other embodiments, the sensor 328 can be positioned at any point along the main line 134 or at any other location in fluid communication therewith.

In particular embodiments, the sensor 328 can comprise a flow meter. In yet more particular embodiments, the sensor 328 can comprise a mass flow meter, such as a Coriolis Flowmeter, or a densiometer.

The OCS can further comprise a second sensor 334 positioned within, or adjacent, the back pressure control system 300. In a particular embodiment, the second sensor 334 can be positioned along the main line 134 after the back pressure control system 300. In this regard, the second sensor 334 can be positioned between the back pressure control system 300 and the fluid return assembly 136. The second sensor 334 can be used by the OCS in conjunction with the sensor 328 to affect a dynamic calculation of the measurable parameter over a known distance within the back pressure control system 300.

Similar to the sensor 328, in particular embodiments, the second sensor 334 can comprise a flow meter. In yet more particular embodiments, the second sensor 334 can comprise a mass flow meter, such as a Coriolis Flowmeter, or a densiometer. It should be understood that the OCS can further comprise additional sensors.

Still referring to FIG. 3, in a further embodiment, the main line 134 can further comprise a pressure release valve (PRV) 336 positioned between the exit port 130 of the well closure system 128 and the back pressure control system 300. The PRV 336 can be positioned in open communication with the main line 134. Moreover, the PRV 336 can be positioned in series or in parallel with the main line 134.

Under normal operating conditions (i.e., hydrostatic pressure is controlled and no blow out condition exists), the PRV 336 can be fully-open and permit the flow of drilling fluid 122 through the main line 134. Under critical conditions (i.e., hydrostatic pressure is uncontrollable or a blow out condition exists), the PRV 336 can reroute the drilling fluid 122 away from the back pressure control system 300 to an auxiliary (emergency) line 338.

Critical conditions can be defined in the PRV 336. Specifically, the PRV 336 can be programmed to reroute drilling fluid 122 to the auxiliary line 338 upon a critical pressure. In other words, in certain embodiments, the PRV 336, or a sensor (not shown) connected thereto, can define a critical pressure parameter which, if reached within the main line 134, can cause the PRV 336 to operatively reroute the drilling fluid 122 away from the back pressure control system 300. The PRV 336 can be automated to automatically reroute drilling fluid 122 upon reaching the critical pressure. Alternatively, the PRV 336 can be a mechanical relief valve adapted to reroute the drilling fluid 122 upon reaching the critical pressure.

In certain embodiments, the PRV 336 can prevent unexpected over pressure conditions and equipment failure. For example, the back pressure control system 300 may be rated to operate at or below a first pressure, $P_1$, whereas the PRV 336 can be adapted to reroute the drilling fluid 122 at a second pressure, $P_2$, where $P_2$ is less than $P_1$. In this regard, the PRV 336 can act as a safety relief valve, rerouting dangerous pressurized fluid away from the back pressure control system 300 or RCD. In particular embodiments, $P_1/P_2$ can be no less than about 1.01, such as no less than about 1.05, no less than about 1.1, no less than about 1.15, no less than about 1.20, or even no less than about 1.25. In further embodiments, $P_1/P_2$ can be no greater than about 2.0, no greater than about 1.75, no greater than about 1.50, or even no greater than about 1.30. Moreover, in yet further embodiments, $P_1/P_2$ can be within a range between and including any of the values described above.

In yet more particular embodiments, $P_1$ can be within a range between about 1,300 pounds per square inch (PSI) and about 1,500 PSI, whereas $P_2$ can be within a range between about 1,000 PSI and about 1,300 PSI.

It should be understood that in particular embodiments, the valve 302 acts in the same operational manner as the PRV 336. In this regard, the PRV 336 is only required when the RCD pressure rating, or maximum rated operational pressure limit, is higher than the pressure rating of the back pressure control system 300.

In particular embodiments, the PRV can have a mechanical control. In alternate embodiments, the PRV can be an electrically controlled valve. In a particular embodiment, the PRV 336 can comprise a ball valve, a butterfly valve, a gate valve, a globe valve, a plug valve, a choke, or any combination thereof. The PRV 336 can be a quarter turn (i.e., 90°) valve adapted to operatively move between an open and closed position. A stem (not shown) can extend radially outward from the PRV 336 and engage along a rotatable central axis with a motor 340. In certain embodiments, the motor 340 may comprise a servomotor. In a particular aspect, the PRV 336 can be adapted to move between a fully-open and a fully-closed orientation in less than about 5 seconds, such as less than about 4 seconds, less than about 3 seconds, less than about 2 seconds, less than about 1 second, less than about 0.5 seconds, or even less than about 0.25 seconds. Moreover, in another aspect, the PRV 336 can be adapted to move between a fully-open and a fully-closed orientation within a range between and including any of the values described above.

In a particular aspect, the back pressure control system 300 can be at least partially integrated into the drilling rig 100. In certain embodiments, the back pressure control system 300 can be positioned on the drilling rig 100. In other embodiment, the back pressure control system 300 can comprise an assembly adapted to attach to the substructure 104 of the drilling rig 100. In yet other embodiments, the back pressure control system 300 can be suspended from the derrick mast. In further embodiments, the back pressure control system 300 can be positioned on at least one platform positioned proximate the drilling rig 100. It should be understood that the invention herein is not intended to be limited by the positioning of the back pressure control system 300 relative to the drilling rig 100.

In a particular aspect, the back pressure control system 300 can be positioned at a vertical height, $H_{BPCS}$, as measured from the surface 124 (e.g., ground level). The exit port 130 of the well closure system 128 can be positioned at a vertical height, $H_E$, as measured from the surface 124 (e.g., ground level). In certain embodiments, $H_{BPCS}$ can be equal, or substantially equal, to $H_E$. In other embodiments, $H_{BPCS}$ can be no less than about 0.9 $H_E$, such as no less than about 0.95 $H_E$, or even no less than about 0.99 $H_E$. In yet further embodiments, $H_{BPCS}$ can be no greater than about 1.1 $H_E$, such as no greater than about 1.05 $H_E$, or even no greater than about 1.01 $H_E$. Moreover, $H_{BPCS}$ can be within a range between and including any of the $H_{BPCS}$ values described above. Alternatively, the back pressure control system 300 can be positioned on the surface 124 (e.g., ground level) or on the substructure 104 of the drilling rig 100.

Whereas traditional pressure control systems are operated by third party service providers and the equipment is attached to the main line of a drilling system by use of an auxiliary line, embodiments of the back pressure control systems described herein can be integral to the drill rig and positioned at a substantially equal vertical height relative to the exit port of the well closure system. In a particular aspect, positioning the back pressure control system at a substantially equal height as the exit port can reduce pressure gradients within the main line, like those typically exhibited by running the main line from the exit port to an off-rig pressure control system at a different elevation. This can further enhance the pressure controlling aspects and sensitivity of embodiments of the present description.

In yet further embodiments, the back pressure control system 300 can comprise a horizontal footprint having a horizontal surface area, $F_{BPCS}$, as measured by the cross-sectional area of the back pressure control system 300. The drilling rig 100 can have an aggregate horizontal footprint having a horizontal surface area, $F_{DR}$. In particular embodiments, $F_{BPCS}$ can be no greater than about 0.1 $F_D$, such as no greater than about 0.09 $F_{DR}$, no greater than about 0.08 $F_{DR}$, no greater than about 0.07 $F_{DR}$, no greater than about 0.06 $F_{DR}$, or even no greater than about 0.05 $F_{DR}$. In further embodiments, $F_{BPCS}$ can be no less than about 0.005 $F_{DR}$, such as no less than about 0.0006 $F_{DR}$, no less than 0.007 $F_{DR}$, or even no less than about 0.008 $F_{DR}$. Moreover, $F_{BPCS}$ can be within a range between and including any of the $F_{DR}$ values described above.

Items.

Item 1. A back pressure control system adapted to be at least partially integrated with a drill rig.

Item 2. A drilling system comprising a back pressure control system connected in series with a main fluid return line extending from an exit of a well closure system to a fluid return assembly.

Item 3. A drilling system comprising:
a drill rig adapted to engage a drill string extending into a borehole;
a well closure system adapted to maintain a fluid in an annular space between the drill string and the borehole, the well closure system having an exit port; and
a main fluid line connected to the exit port of the well closure system, the main fluid line comprising a back pressure control system.

Item 4. A drilling system comprising:
a drilling rig engaging a drill string which extends into a borehole;
a well closure system which maintains a fluid in an annular space between the drill string and the borehole, the well closure system having an exit port whereby a controlled flow of fluid from the annular space is permitted; and
a main fluid line connected to the exit of the well closure system, the main fluid line further comprising a back pressure control system comprising:
a valve; and
an adjustable flow control apparatus in parallel with the valve, wherein the adjustable flow control apparatus is self-clearing.

Item 5. The back pressure control system or drilling system according to any one of items 1-3, wherein the back pressure control system comprises:
a valve; and
an adjustable flow control apparatus positioned in parallel with the valve.

Item 6. The back pressure control system or drilling system according to any one of items 4 or 5, wherein the valve is positioned in series with the main fluid line.

Item 7. The back pressure control system or drilling system according to any one of items 5 or 6, wherein the adjustable flow control apparatus is self-clearing.

Item 8. The back pressure control system or drilling system according to any one of items 4-7, wherein the adjustable flow control apparatus is positioned on a secondary line, wherein the secondary line is in parallel with the main fluid line, and wherein the secondary line connects with the main fluid line at opposite sides of the valve.

Item 9. The back pressure control system or drilling system according to any one of items 4-8, wherein the adjustable flow control apparatus comprises a quarter-turn adjustable flow control apparatus.

Item 10. The back pressure control system or drilling system according to any one of items 4-9, wherein the adjustable flow control apparatus comprises a quarter-turn rotary valve.

Item 11. The back pressure control system or drilling system according to any one of items 4-10, wherein the adjustable flow control apparatus comprises a choke.

Item 12. The back pressure control system or drilling system according to any one of items 4-11, wherein the adjustable flow control apparatus defines an asymmetrical opening.

Item 13. The back pressure control system or drilling system according to item 12, wherein the asymmetrical opening has a vertical profile defining first vertical end and a second vertical end, wherein the first vertical end is positioned below the second vertical end, and wherein, during opening, the first vertical end opens first.

Item 14. The back pressure control system or drilling system according to any one of items 12 or 13, wherein the asymmetrical opening is generally polygonal as viewed in a plane perpendicular to a fluid flow in the main line.

Item 15. The back pressure control system or drilling system according to any one of items 12-14, wherein the asymmetrical opening is generally triangular as viewed in a plane perpendicular to a fluid flow in the main line.

Item 16. The back pressure control system or drilling system according to any one of items 12-15, wherein the asymmetrical opening comprises at least one step.

Item 17. The back pressure control system or drilling system according to any one of items 12 or 13, wherein the asymmetrical opening is generally ellipsoidal as viewed in a plane perpendicular to a fluid flow in the main line.

Item 18. The back pressure control system or drilling system according to any one of items 13-17, wherein the first vertical end has a width, $W_1$, as seen when viewed in a plane perpendicular to a fluid flow in the main line, wherein the second vertical end has a width, $W_2$, as seen when viewed in a plane perpendicular to a fluid flow in the main line, and wherein $W_1$ no less than about 1.1 $W_2$, such as no less than about 1.25 $W_2$, no less than about 1.5 $W_2$, no less than about 1.75 $W_2$, no less than about 2.0 $W_2$, no less than about 2.5 $W_2$, no less than about 3.0 $W_2$, no less than about 5 $W_2$, no less than about 10 $W_2$, no less than about 15 $W_2$, no less than about 20 $W_2$, no less than about 30 $W_2$, no less than about 50 $W_2$, no less than about 75 $W_2$, no less than about 100 $W_2$.

Item 19. The back pressure control system or drilling system according to any one of items 4-18, wherein a motor is attached to the valve, the motor adapted to open and close the valve.

Item 20. The back pressure control system or drilling system according to any one of items 4-19, wherein a servomotor is attached to the valve, the servomotor adapted to open and close the valve.

Item 21. The back pressure control system or drilling system according to any one of items 4-20, wherein the valve is adapted to move between a fully-open and fully-closed orientation in less than about 5 seconds, less than about 4 seconds, less than about 3 seconds, less than about 2 seconds, less than about 1 second, or even less than about 0.5 seconds.

Item 22. The back pressure control system or drilling system according to any one of items 4-21, wherein a motor is attached to the adjustable flow control apparatus, the motor adapted to open and close the adjustable flow control apparatus.

Item 23. The back pressure control system or drilling system according to any one of items 4-22, wherein a servomotor is attached to the adjustable flow control apparatus, the servomotor adapted to open and close the adjustable flow control apparatus.

Item 24. The back pressure control system or drilling system according to any one of items 4-23, wherein the adjustable flow control apparatus is adapted to move between a fully-open and fully-closed orientation in less than about 5 seconds, less than about 4 seconds, less than about 3 seconds, less than about 2 seconds, less than about 1 second, or even less than about 0.5 seconds.

Item 25. The back pressure control system or drilling system according to any one of items 4-24, further comprising a pressure release valve (PRV) positioned between the well closure system and the back pressure control system.

Item 26. The back pressure control system or drilling system according to item 25, wherein the PRV is connected to the main fluid line in series.

Item 27. The back pressure control system or drilling system according to any one of items 25 or 26, wherein, under normal operating conditions, the PRV permits fluid flow through the main line.

Item 28. The back pressure control system or drilling system according to any one of items 25-27, wherein the PRV defines a critical parameter, and wherein the PRV is adapted to redirect a fluid flow from the main line to an auxiliary line upon reaching the critical parameter.

Item 29. The back pressure control system or drilling system according to any one of items 25-27, wherein the critical parameter is pressure.

Item 30. The back pressure control system or drilling system according to any one of items 25-29, wherein the back pressure control system is rated to operate at a first pressure, $P_1$, wherein the PRV is adapted to reroute a fluid flow at a second pressure, $P_2$, and wherein $P_2$ is less than $P_1$.

Item 31. The back pressure control system or drilling system according to item 30, wherein $P_1/P_2$ is no less than about 1.01, no less than about 1.05, no less than about 1.1, no less than about 1.15, no less than about 1.20, or even no less than about 1.25.

Item 32. The back pressure control system or drilling system according to any one of items 30 or 31, wherein $P_1/P_2$ is no greater than about 2.0, no greater than about 1.75, no greater than about 1.50, or even no greater than about 1.30.

Item 33. The back pressure control system or drilling system according to any one of items 30-32, wherein $P_1$ is between about 1,300 pounds per square inch (PSI) and about 1,500 PSI, and wherein $P_2$ is between about 1,000 PSI and bout 1,300 PSI.

Item 34. The back pressure control system or drilling system according to any one of items 25-33, wherein a motor is attached to the PRV, the motor adapted to open and close the PRV.

Item 35. The back pressure control system or drilling system according to any one of items 25-34, wherein the PRV is a mechanical relief valve.

Item 36. The back pressure control system or drilling system according to any one of items 25-35, wherein the PRV is adapted to redirect fluid to the auxiliary line in less than about 5 seconds, less than about 4 seconds, less than about 3 seconds, less than about 2 seconds, less than about 1 second, or even less than about 0.5 seconds.

Item 37. The back pressure control system or drilling system according to any one of the preceding items, wherein the back pressure control system comprises an operator control system (OCS) adapted to allow an operator to affect operation of the back pressure control system.

Item 38. The back pressure control system or drilling system according to item 37, wherein the OCS comprises a control element allowing the operator to affect operation of the back pressure control system.

Item 39. The back pressure control system or drilling system according to item 38, wherein the control element is integrated into the drill rig.

Item 40. The back pressure control system or drilling system according to item 38, wherein the control element is not integrated into the drill rig.

Item 41. The back pressure control system or drilling system according to any one of items 37-40, wherein the OCS comprises
a sensor adapted to repeatedly sense a measurable parameter;
a logic element in communication with the sensor, the logic element adapted to perform a calculation based on the measurable parameter; and
a display in communication with the logic element, the display adapted to relay the measurable parameter to the operator.

Item 42. The back pressure control system or drilling system according to item 41, wherein the measurable parameter is pressure.

Item 43. The back pressure control system or drilling system according to any one of items 41 or 42, wherein the sensor is positioned along the main line between the well closure system and the back pressure control system.

Item 44. The back pressure control system or drilling system according to any one of items 41 or 42, wherein the sensor is positioned within the back pressure control system.

Item 45. The back pressure control system or drilling system according to any one of items 41-44, wherein the sensor is a flowmeter.

Item 46. The back pressure control system or drilling system according to any one of items 41-45, wherein the sensor is a Coriolis flow meter.

Item 47. The back pressure control system or drilling system according to any one of items 41-46, wherein the OCS further comprises a second sensor positioned along the main line after the back pressure control system.

Item 48. The back pressure control system or drilling system according to any one of the preceding items, wherein the back pressure control system comprises a horizontal footprint, $F_{BPCS}$, as measured by the horizontal cross-sectional area of the system, wherein the drilling rig has footprint, $F_{DR}$, as measured by the horizontal cross-sectional area of a drilling floor of the drilling rig, and wherein $F_{BPCS}$ is no greater than about 0.1 $F_{DR}$, such as no greater than about 0.09 $F_{DR}$, no greater than about 0.08 $F_{DR}$, no greater than about 0.07 $F_{DR}$, no greater than about 0.06 $F_{DR}$, or no greater than about 0.05 $F_{DR}$.

Item 49. The back pressure control system or drilling system according to item 48, wherein $F_{BPCS}$ is no less than about 0.005 $F_{DR}$, no less than about 0.006 $F_{DR}$, no less than about 0.007 $F_{DR}$, no less than about 0.008 $F_{DR}$.

Item 50. The back pressure control system or drilling system according to any one of the preceding items, wherein the back pressure control system is positioned at a vertical height, $H_{BPCS}$, as measured from the ground, wherein the exit of the well closure system is at a vertical height, $H_E$, and wherein $H_{BPCS}$ is approximately equal to $H_E$.

Item 51. The back pressure control system or drilling system according to item 50, wherein $H_{BPCS}$ is no less than about 0.9 $H_E$, no less than about 0.95 $H_E$, or no less than about 0.99 $H_E$.

Item 52. The back pressure control system or drilling system according to any one of items 50 or 51, wherein $H_{BPCS}$ is no greater than about 1.1 $H_E$, no greater than about 1.05 $H_E$, or no greater than about 1.01 $H_E$.

Item 53. A method of managing back pressure while drilling, the method comprising:
attaching a back pressure control system in series with a main line of a drill rig, the back pressure control system having:
a valve positioned along the main line; and
an adjustable flow control apparatus in parallel with the valve, wherein the adjustable flow control apparatus is self-clearing;
pressurizing the main line to create a pressurized fluid flow through the back pressure control system;
monitoring a sensor positioned along the main line, the sensor monitoring fluidic pressure; and
adjusting the position of the valve and the adjustable flow control apparatus in response to changes in the fluidic pressure in the main line.

The embodiments herein are directed to a drilling system for use in drilling operations to control the pressure within the annulus of a wellbore. Notably, in particular embodiments, the present drilling system is at least partially integrated into the drill rig and in certain embodiments, controllable therefrom. The drilling system can be fully integrated with the drilling rig 100 and transported therewith.

The embodiments provide a combination of features, which can be combined in various matters to describe and define a method and system of the embodiments. The description is not intended to set forth a hierarchy of features, but different features that can be combined in one or more manners to define the invention. In the foregoing, reference to specific embodiments and the connection of certain components is illustrative. It will be appreciated that reference to components as being coupled or connected is intended to disclose either direct connected between said components or indirect connection through one or more intervening components as will be appreciated to carry out the methods as discussed herein.

As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A drilling system comprising a back pressure control system connected in series with a main fluid return line extending from an exit of a well closure system to a fluid return assembly,
wherein the back pressure control system is positioned at a vertical height from ground level, $H_{BPSC}$, the exit of the well closure system is positioned at a vertical height from ground level, $H_E$, and wherein $H_{BPCS}$ is not less than 0.90 $H_E$ and not greater than 1.1 $H_E$; and
wherein the back pressure control system comprises:
a valve positioned in series with the main fluid return line, the valve configured to provide unimpeded flow of drilling fluid through the main fluid return line and the valve to the fluid return assembly when the valve is in an open configuration; and
an adjustable flow control apparatus comprising a choke positioned on a secondary line in parallel with the main fluid return line,
wherein the adjustable flow control apparatus defines an asymmetrical opening having a vertical profile defining a first vertical end having a width, $W_1$, and a second vertical end having a width, $W_2$, wherein the second vertical end is positioned above the first vertical end, and wherein the first vertical end is configured to be exposed before the second vertical end when moving the choke to an open position; and wherein $W_1$ is greater than $W_2$.

2. The drilling system according to claim 1, wherein the adjustable flow control apparatus is self-clearing.

3. The drilling system according to claim 1, wherein the back pressure control system comprises an operator control system (OCS) adapted to allow an operator to affect operation of the back pressure control system, and wherein the OCS comprises:
a sensor adapted to repeatedly sense a measurable parameter;
a logic element in communication with the sensor, the logic element adapted to perform a calculation based on the measurable parameter; and
a display in communication with the logic element, the display adapted to relay the measurable parameter to the operator.

4. The drilling system according to claim 3, wherein the measurable parameter is pressure.

5. The drilling system according to claim 1, wherein the valve comprises a ball valve.

6. The drilling system according to claim 5, wherein the ball valve comprises a full bore ball valve.

7. The drilling system according to claim 1, wherein the back pressure control system is positioned on a drilling rig, positioned on a platform positioned proximate a drilling rig, or suspended from a derrick mast of a drilling rig.

8. The drilling system according to claim 1, wherein the back pressure control system comprises an assembly adapted to attach to a substructure of a drilling rig.

9. A drilling system comprising:
a drill rig adapted to engage a drill string extending into a borehole;
a well closure system adapted to maintain a fluid in an annular space between the drill string and the borehole, the well closure system having an exit port; and
a main fluid line connected to the exit port of the well closure system, the main fluid line comprising a back pressure control system,
wherein the back pressure control system is positioned at a vertical height from ground level, $H_{BPSC}$, the exit of the well closure system is positioned at a vertical height from ground level, $H_E$, and wherein $H_{BPCS}$ is not less than 0.90 $H_E$ and not greater than 1.1 $H_E$; and
wherein the back pressure control system comprises:
a valve positioned in series with the main fluid line, the valve configured to be in an open configuration during routine drilling operations such that drilling fluid can pass unimpeded through the main fluid return line and the valve to the fluid return assembly; and
an adjustable flow control apparatus comprising a choke positioned on a secondary line in parallel with the main fluid line,
wherein the adjustable flow control apparatus defines an asymmetrical opening, having a vertical profile defining a first vertical end having a width, $W_1$, and a second vertical end having a width, $W_2$, wherein $W_1$ is greater than $W_2$, wherein the second vertical end is ositioned above the first vertical end, and wherein the first vertical end is configured to be exposed before the second vertical end when moving the choke to an open position.

10. The drilling system according to claim 9, wherein the adjustable flow control apparatus is self-clearing.

11. The drilling system according to claim 9, wherein the back pressure control system comprises an operator control system (OCS) adapted to allow an operator to affect operation of the back pressure control system, and wherein the OCS comprises:
a sensor adapted to repeatedly sense a measurable parameter;
a logic element in communication with the sensor, the logic element adapted to perform a calculation based on the measurable parameter; and
a display in communication with the logic element, the display adapted to relay the measurable parameter to the operator.

12. The drilling system according to claim 11, wherein the measurable parameter is pressure.

13. The drilling system according to claim 11, wherein the OCS comprises a control element allowing the operator to affect operation of the back pressure system, and wherein the control element is integrated into the drill rig.

14. A drilling system comprising:
a drilling rig engaging a drill string which extends into a borehole;
a well closure system which maintains a fluid in an annular space between the drill string and the borehole, the well closure system having an exit port whereby a controlled flow of fluid from the annular space is permitted; and
a main fluid line connected to the exit of the well closure system, the main fluid line further comprising a back pressure control system comprising:
an adjustable flow control apparatus comprising a choke, wherein the choke comprises an asymmetrical opening having a vertical profile defining a first vertical end having a width, $W_1$, and a second vertical end having a width, $W_2$, wherein $W_1$ is greater than $W_2$, wherein the second vertical end is positioned above the first vertical end, and wherein the first vertical end is configured to be exposed before the second vertical end when moving the choke to an open position; and
wherein the back pressure control system is positioned at a vertical height from ground level, $H_{BPSC}$, the exit of the well closure system is positioned at a vertical height from ground level, $H_E$, and wherein $H_{BPCS}$ is not less than 0.90 $H_E$ and not greater than 1.1 $H_E$.

15. The drilling system according to claim 14, further comprising a valve positioned in series with the main fluid line.

16. The drilling system according to claim 14, further comprising a pressure release valve (PRV) positioned between the well closure system and the back pressure control system.

17. The drilling system according to claim 16, wherein the PRV defines a critical parameter, and wherein the PRV is adapted to redirect a fluid flow from the main line to an auxiliary line upon reaching the critical parameter.

18. The drilling system according to claim 14, wherein the choke is positioned on a secondary line in parallel with the main fluid line.

* * * * *